US005574963A

United States Patent [19]

Weinblatt et al.

[11] Patent Number: 5,574,963

[45] Date of Patent: Nov. 12, 1996

[54] AUDIENCE MEASUREMENT DURING A MUTE MODE

[75] Inventors: Lee S. Weinblatt, 797 Winthrop Rd., Teaneck, N.J. 07666; Thomas Langer, Teaneck, N.J.

[73] Assignee: Lee S. Weinblatt, Teaneck, N.J.

[21] Appl. No.: 509,322

[22] Filed: Jul. 31, 1995

[51] Int. Cl.[6] .......... H04B 17/00

[52] U.S. Cl. .......... 455/2; 455/6.3; 348/1; 348/2

[58] Field of Search .......... 348/1, 2, 3, 4, 348/6, 5, 10; 455/2, 3.1, 5.1, 6.1, 38.1, 6.3; 358/84; H04N 7/16, 7/173, 7/00

[56] References Cited

U.S. PATENT DOCUMENTS

| | | | |
|---|---|---|---|
| 4,025,851 | 5/1977 | Haselwood et al. | 348/4 |
| 4,618,995 | 10/1986 | Kemp | 455/2 |
| 4,718,106 | 1/1988 | Weinblatt | 455/2 |
| 4,930,011 | 5/1990 | Kiewit | 455/2 |
| 4,955,070 | 9/1990 | Welsh et al. | 455/2 |
| 5,023,929 | 6/1991 | Call | 455/2 |
| 5,213,337 | 5/1993 | Shermann | 273/439 |
| 5,382,970 | 1/1995 | Kiefl | 348/1 |
| 5,450,490 | 9/1995 | Jensen et al. | 380/6 |
| 5,457,807 | 10/1995 | Weinblatt | 455/2 |

*Primary Examiner*—John K. Peng
*Assistant Examiner*—Chris Grant
*Attorney, Agent, or Firm*—Frishauf, Holtz, Goodman, Langer & Chick, P.C.

[57] ABSTRACT

A monitoring apparatus which is operable during muting, even though it relies on audio to monitor program signals transmitted by broadcast sources. The monitoring is performed by transmitting a combined signal derived by adding a code to an audio program signal. During muting, the audio is inhibited by actuating a switch. However, the code is separated from the combined signal and routed so as to bypass the switch in order to enable the monitoring to continue.

4 Claims, 2 Drawing Sheets

AUDIENCE MEASUREMENT DURING A MUTE MODE

BACKGROUND OF THE INVENTION

This invention is directed to a code-based monitoring technique for determining audience exposure to a signal of interest reproduced on a television or radio set and, in particular, for enabling detection of a code combined with an audio portion of the signal even when the audio of the set is placed in a mute mode.

Various techniques are known for monitoring transmissions from signal sources such as a television station, a radio station, and cable television channels (referred to collectively hereinafter as "broadcast source"). The signal of interest might be a program being broadcast on the air as the monitoring is taking place, it might be a recorded program being played back on a VCR, or it might even be a commercial. The monitoring is carried out to provide information that, for example, reveals the size of the audience tuned to a given broadcast source at a given time of day, determines the total number of people who have seen a program, provides independent validation that a commercial has been broadcast, and so on. Such information is useful for broadcasters, advertisers, etc. As used hereinafter, the term "program signal" is intended to include all signals, be they, for example, an on-air broadcast or one that has been recorded, a show or a commercial about which such information is being collected.

One approach that has been adopted to before such monitoring is to combine the audio portion of a program signal with a code signal. This is disclosed in U.S. Pat. No. 4,718,106. The combined signal is made available, such as by on-air broadcast, to an intended audience. Certain members of the intended audience are provided with a monitoring apparatus that can detect the code portion of the combined signal. Of course, as explained above, that code portion is part of the audio signal. Consequently, when a television set, for example, is placed in what is conventionally known as a mute mode, the audio portion of the program signal is inhibited from producing sound. Therefore, muting also results in suppression of the code signal. In the absence of such a code signal, it is not possible with the prior art techniques to continue monitoring the program signal by relying on the audio portion of the program signal. Consequently, this mute mode creates an unacceptable gap in the capability of the monitoring apparatus to track the program signal.

Continuing to monitor such information even during muting is useful because the viewer can still be watching the program and/or the commercials even though the audio is muted. Also, when commercial validation is being performed (i.e., to check whether a commercial that has been paid for is actually transmitted by the broadcast source), the commercial might coincidentally be shown during muting. In such a case, the monitoring results would be incorrect. In such a situation, obtaining monitoring information during muting would be of critical importance to determine whether or not a commercial which has been paid for has actually been broadcast. Thus, it is highly desirable to maintain the capability of monitoring the program signal even though a mute mode has been actuated.

SUMMARY OF THE INVENTION

An object of the invention is to provide an improved apparatus for monitoring a program signal transmitted by a broadcast source.

A further object of the invention is to provide a monitoring apparatus that utilizes an audio code and which is capable of continuing its monitoring operation even during a mute mode.

These and other objects are attained in accordance with one aspect of the invention directed to an apparatus for monitoring a program signal transmitted by a broadcast source, wherein an audio portion of the program signal is combined with a coded signal for transmission as a combined signal. The apparatus includes a receiver and a monitoring unit, and the monitoring unit responds to the coded signal for collecting information about at least one of the program signal and broadcast source. The receiver includes a tuner for detecting the combined signal transmitted by the broadcast source, a loudspeaker, and a switch between the tuner and loudspeaker having a first condition for passing signals from the tuner to the loudspeaker and a second condition for blocking signals from the tuner to the loudspeaker. The receiver further includes an actuator responsive to a mute mode command and coupled to the switch for controlling the condition thereof such that the switch is in the first condition during a normal operating mode and in the second condition during the mute mode. A code detector detects the coded signal and is coupled to the tuner. A bypass means is controlled by the actuator and coupled to the code detector for passing the coded signal to the monitoring unit during the mute mode.

DETAILED DESCRIPTION OF THE INVENTION

A receiver, such as is typically found in a television set and a radio set, includes a tuner and amplifier. The tuner is utilized to detect a signal of a selected frequency within a specified range of frequencies. The amplifier receives the output of the tuner and increases the amplitude of the signal to a level which is required by the remaining circuitry and, in particular, by a speaker. If the output of the amplifier is fed directly to a loudspeaker, for example, then the output of the amplifier must be at a sufficiently high level so as to be capable to properly drive the loudspeaker to produce a sound.

Figure 1:
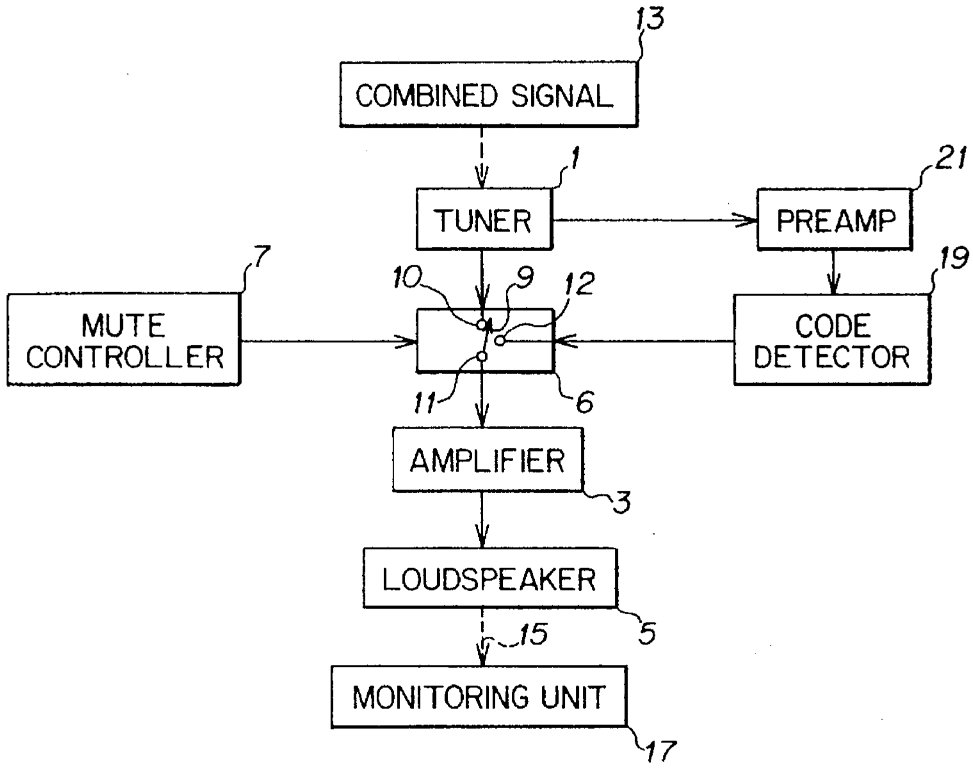
FIG. 1 is a schematic circuit diagram of one embodiment of the invention.

FIG. 1 shows such a tuner 1, as well as amplifier 3 and loudspeaker 5. Between tuner 1 and amplifier 3 is a switch 6, the status of which depends on the output of mute controller circuit 7 which responds to mute mode commands from a source, as discussed below. Switch 6 includes pole 9, and contacts 10 and 12. During a normal, i.e., non-mute, mode of operation, pole 9, which is fixed to contact 11, connects contacts 10 and 11 to each other so that the output of the tuner 1 is fed to the input of amplifier 3. However, when a mute mode is actuated, mute controller 7 causes pole 9 to break its engagement with contact 10 so that the output of tuner 1 is no longer fed to amplifier 3. Thus, loudspeaker 5 receives no signal and, therefore, a period of silence ensues. Mute controller 7 is typically actuated by a mute command source such as a remote control unit (not shown)or a panel button (not shown). The description so far has been of a typical receiver unit such as is found in a television set and radio set.

For program signal monitoring purposes, the overall monitoring apparatus includes a combined signal 13 which is transmitted by a broadcast source. The combined signal 13 is processed by tuner 1, amplifier 3 and loudspeaker 5 with the result being that loudspeaker 5 produces an acoustic signal 15 that is emitted toward and detected by monitoring unit 17. Monitoring unit 17 can be a portable unit worn by a member of an audience being surveyed. Such unit can be, for example, a watch as disclosed in U.S. Pat. No. 4,718,106. Another type of monitoring unit 17 is a device which is installed in the receiver unit and has a microphone placed in close proximity to loudspeaker 5. This arrangement is shown in U.S. Ser. No. 08/215,176, filed Mar. 21, 1994, now U.S. Pat. No. 5,457,807. The acoustic signal is converted to a non-acoustic signal for detection by the above-mentioned portable unit. Another approach is disclosed in U.S. Ser. No. 08/003,325, filed Jan. 12, 1993, which converts coded signals detected by tuner 1 that are in the audio frequency range and within the hearing of a person to coded acoustic signals for reproduction by a loudspeaker, but outside such hearing range.

As is evident from the overall explanation provided above, when mute controller 7 actuates switch 6 so as to cause disengagement of pole 9 from contact 10, no signal will be emitted by loudspeaker 5 and, therefore, monitoring unit 17 is rendered inactive. It is an aim of this invention to avoid such a condition. This is accomplished as follows.

In accordance with the present invention, a code detector circuit 19 is provided which is coupled between tuner 1 and switch 6. Code detector 19 is capable of identifying the code portion of the combined signal obtained from the output of tuner 1 and separating it from the program portion. For example, the code might be inserted into a frequency notch in the program signal, and code detector 19 is tuned precisely on the notch. A digital approach is to stamp a code with a predetermined sequence of leading bits. Thus, whenever code detector 19 recognizes the predetermined sequence of leading bits, it "knows" that the several bits in the next sequence, of predetermined length, is the code. Of course, these approaches are merely illustrative of how code detector 19 can be made to operate.

The code portion of the combined signal is provided by code detector 19 to contact 12 of switch 6 which is engageable by pole 9. More particularly, when mute controller 7 responds to a mute command, it causes pole 9 to move away from engagement with contact 10 and into engagement with contact 12. Consequently, the transmitted code is provided via switch 6 to amplifier 3 and loudspeaker 5. Thus, during a mute mode, this code is acoustically emitted by loudspeaker 5 so that acoustic signal 15 carries this code to monitoring unit 17. As a result, monitoring unit 17 remains in an operationally active condition to continue its task of monitoring the program signal, despite the fact that the audio circuitry of the receiver set has been placed into a mute mode.

It should be noted that the fact that loudspeaker 5 is emitting an acoustic signal during muting does not necessarily conflict with the aim of providing a mute mode because the acoustic signal 15 emitted by loudspeaker 5 can be made such as to be imperceivable by humans. This can be accomplished by, for example, suitably controlling the amplitude and/or frequency of that acoustic signal. As regards amplitude, if monitoring unit 17 is of the type having a device retrofitted to the set so as to have the microphone placed in close proximity to the speaker, as disclosed in U.S. Ser. No. 08/215,176, mentioned above, the amplitude is inherently so low that the code on acoustic signal 15 is not perceivable to a person. If, on the other hand, monitoring unit 17 is a portable device worn by an individual, thefrequency can be controlled to be such that it is within the reproducible range of loudspeaker 5 but, nevertheless, is outside the normal hearing range of humans. Such an arrangement is disclosed in U.S. Ser. No. 08/003,325, mentioned above.

FIG. 1 also shows a preamplifier 21 connected between tuner 1 and code detector 19. Such a preamp may be required so that the output of tuner 1 can be made compatible with the input requirements of code detector 19. Whether or not preamp 21 is used as a separate circuit depends on the specific relative circuit characteristics of tuner 1 and code detector 19.

Figure 2:
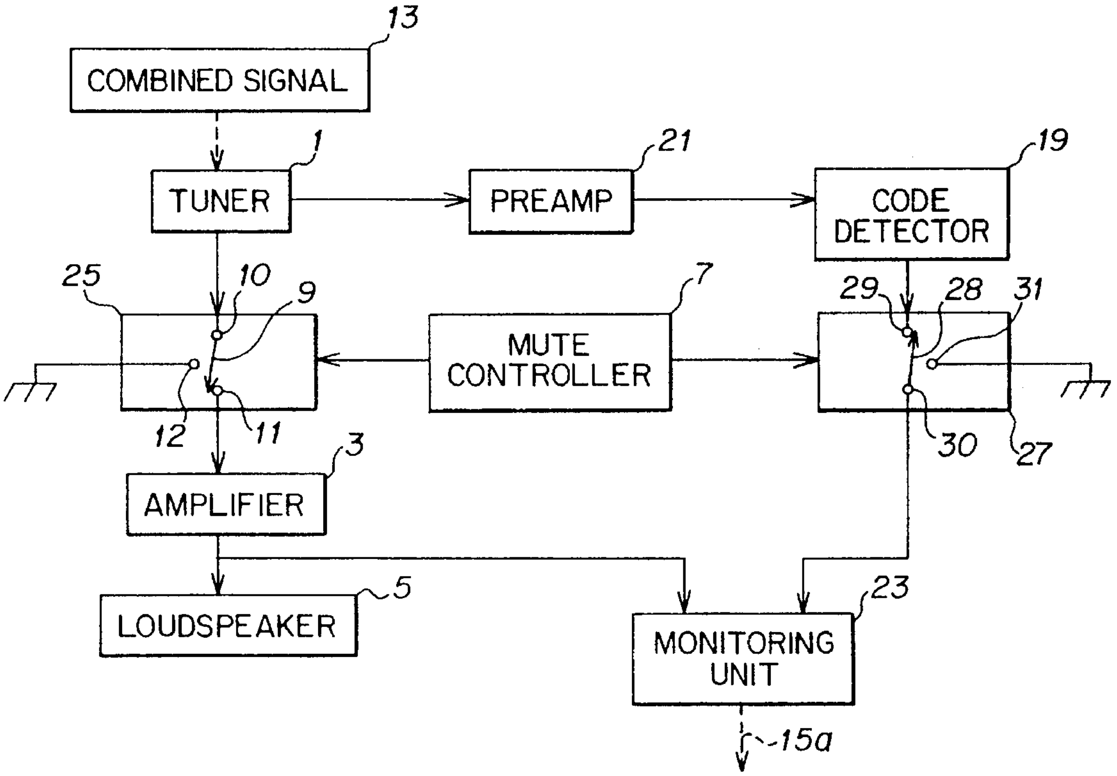
FIG. 2 is a schematic circuit diagram of a second embodiment of the invention.

FIG. 2 is similar to FIG. 1 in terms of utilizing the same tuner 1, amplifier 3, loudspeaker 5, mute controller 7, code detector 19 and preamp 21. However, monitoring unit 23 is different from monitoring unit 17. It will be recalled that monitoring unit 17 of FIG. 1 detects signal 15 which is transmitted acoustically by loudspeaker 5. However, monitoring unit 23 is hard-wired to the monitoring apparatus.

FIG. 2 shows that the output of code detector 19 during a mute mode is preferably fed directly to monitoring unit 23 rather than via amplifier 3. Unlike the FIG. 1 embodiment, the FIG. 2 embodiment does not need to emit an acoustic signal even during a mute mode. Therefore, the embodiment depicted in FIG. 2 avoids feeding the code to loudspeaker 5 during such a mute mode. This contributes maximum flexibility for the type of coding signal that is used without risking the possibility of noise being produced by loudspeaker 5 during a mute mode.

In order to effect such an arrangement, switch 25 is operated by mute controller 7 to have pole 9, which is fixed to contact 10, toggled between contacts 11 and 12, but contact 12 is grounded. Pole 9 is fixed to contact 10 in FIG. 2 rather than to contact 11, as in FIG. 1. Another switch 27 is provided between code detector 19 and monitoring unit 23. Switch 27, like switch 25, is operated by mute controller 7. More specifically, pole 28 is fixed to contact 30 and is normally, i.e., in a non-mute mode, engaged with grounded contact 31. However, during a mute mode, pole 28 is moved into engagement with contact 29 so that the code from code detector 19 is inputted to monitoring unit 23.

Monitoring unit 23 depicted in FIG. 2 can be a stationary component which receives the code signal. It then retransmits the code signal, as signal 15a, to the portable units described above.

Figure 3:
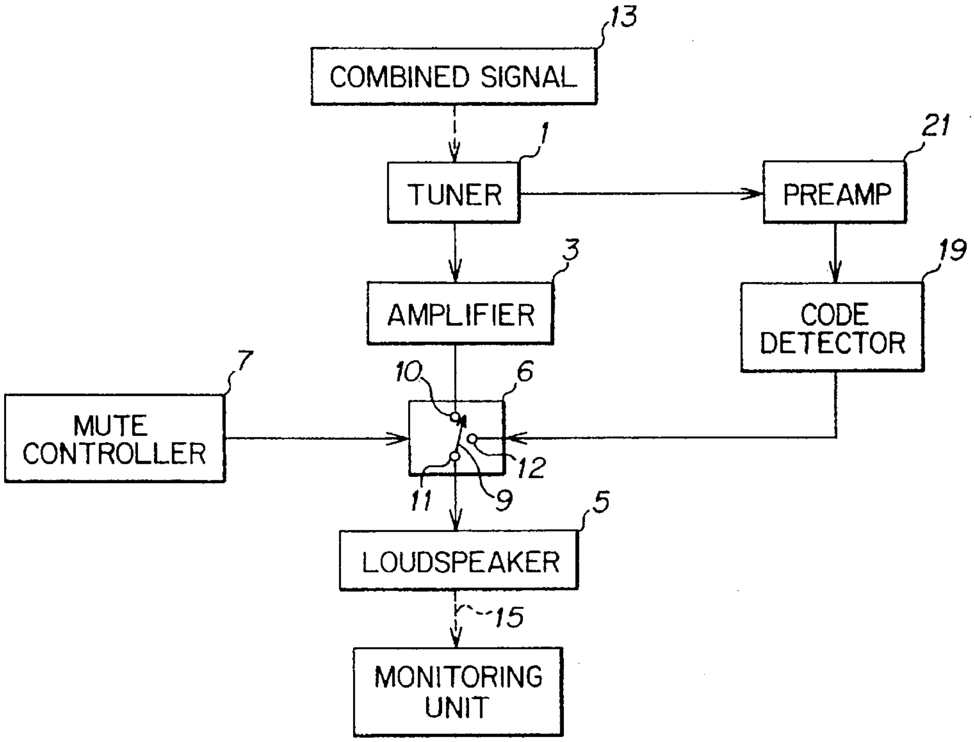
FIG. 3 is a schematic circuit diagram of a third embodiment of the invention.

FIG. 3 is similar to the FIG. 1 embodiment in the sense that it utilizes monitoring unit 17 responsive to acoustic signal 15 emitted by loudspeaker 5. Also, tuner 1, amplifier 3, switch 6, mute controller 7 and code detector 19 are the same as in FIG. 1.

The embodiment of FIG. 3 differs from FIG. 1 because switch 6, rather than being between tuner 1 and amplifier 3 is, instead, between amplifier 3 and loudspeaker 5. Thus, during a mute mode, the amplifier continues to receive the tuner output signal, but switch 6 inhibits the output of the amplifier from reaching loudspeaker 5. However, code detector 19 feeds loudspeaker 5, in case of a mute mode, with the code from combined signal 13 so that this code is emitted by loudspeaker 5 as acoustic signal 15 for detection by monitoring unit 17, as described above. Preamp 21 may or may not be necessary under the conditions described above in connection with FIG. 1. It is also possible to connect code detector 19 to the output of amplifier 3, thereby perhaps obviating the need for preamp 21. Of course, as explained above, amplifier 3 remains operationally active even during a mute mode.

Figure 4:
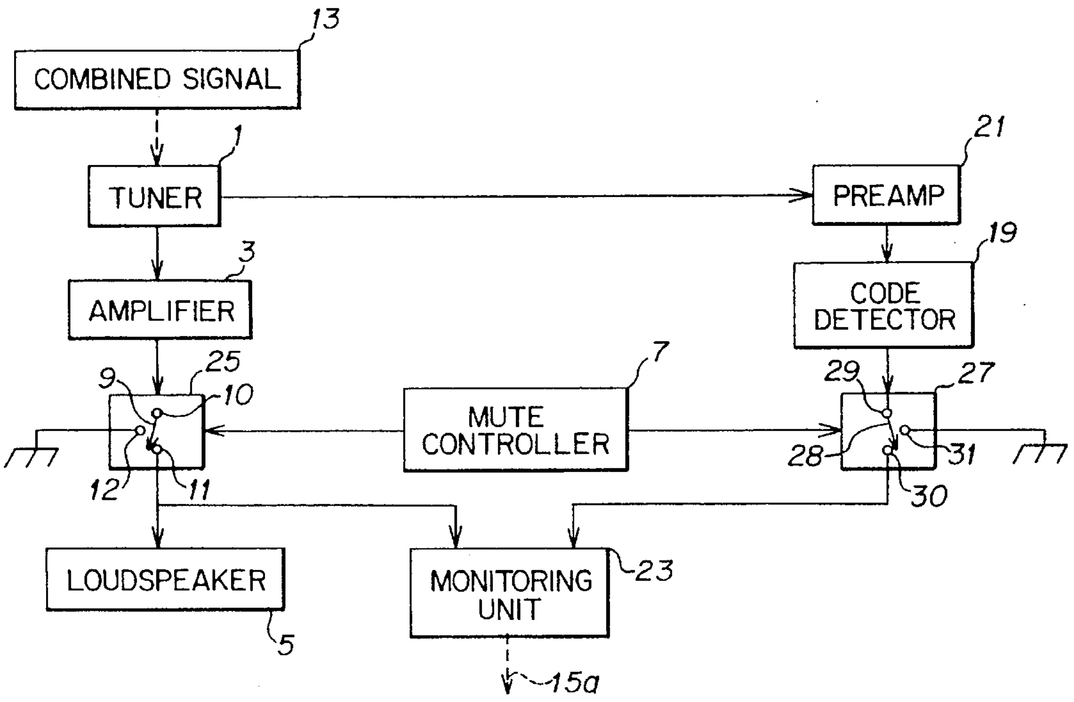
FIG. 4 is a schematic circuit diagram of a fourth embodiment of the invention.

FIG. 4 depicts an embodiment similar to FIG. 2 in the sense that monitoring unit 17 is hard-wired into the monitoring apparatus. Combined signal 13 is processed by the same tuner 1, amplifier 3, loudspeaker 5, mute controller 7, code detector 19, switch 25 and switch 27. Preamp 21 may or may not be needed for the reasons mentioned above.

Selecting the placement of switch 6 as between the alternative arrangements of FIGS. 1 and 3 depends on how the circuitry in the receiver is designed. For example, present day receivers utilize integrated circuits which may have both the tuner and amplifier on board a single chip. Such circuitry may make the arrangement of FIG. 1 difficult to achieve because the line connecting the tuner to the amplifier may be difficult to identify. In that case, the arrangement of FIG. 3 would be used. Thus, which switch positioning arrangement is adopted is at least partly dictated by the type of circuitry in the receiver. The same observation applies to the alternative switch arrangements in the FIGS. 2 and 4 embodiments as regards the positioning of switch 25.

Although preferred embodiments of the present invention have been disclosed in detail above, various changes thereto will be readily apparent to one with ordinary skill in the art. For example, FIGS. 2 and 4 show switches 25 and 27 as two separate switches. However, the same functions can be implemented with a single switch unit that is of the double pole type. Likewise, FIGS. 1 and 3 show use of one switch of the single pole double throw type. This could be changed to two switches of the single pole single throw type. Also, FIGS. 2 and 4 show the combined signal at the output of amplifier 3 being inputted to the loudspeaker 5 during normal, non-mute operation. However, the coded signal could be removed therefrom in conventional fashion, such as by filtering, to reduce the possibility of discernible noise being created by the coded signal when it is played through loudspeaker 5. In addition, if the above-described integrated circuit chip makes it difficult to access the output of the tuner or for other reasons, rather than coupling code detector 19 to tuner 1, a second tuner (not shown) ganged with tuner 1 can be used. The second tuner could either be active continuously or it could be activated only during muting, say by the mute controller 7. This approach could be used for all of the above-disclosed embodiments which otherwise remain unchanged. All such changes are intended to fall within the scope of the present invention as defined by the following claims.

We claim:

1. Apparatus for monitoring a program signal transmitted by a broadcast source, wherein an audio portion of the program signal is combined with a coded signal for transmission as a combined signal, said apparatus including a receiver and a monitoring unit, wherein at least a portion of said monitoring unit is portable and responds to the coded signal for collecting information about at least one of the program signal and broadcast source, and wherein the receiver comprises:

a tuner for detecting the combination signal transmitted by the broadcasting source, a loudspeaker, a switch between said tuner and said loudspeaker having a first condition for passing signals from said tuner to said loudspeaker and a second condition for blocking signals from said tuner to said loudspeaker, an actuator responsive to a mute mode command and coupled to the switch for controlling the condition thereof such that the switch is in the first condition during a normal operating mode and in the second condition during a mute mode, a code detector for detecting the coded signal and coupled to said tuner, and bypass means controlled by said actuator and coupled to said code detector for passing the coded signal to the monitoring unit during the mute mode.

2. The apparatus of claim 1, wherein the coded signal is reproduced by the loudspeaker, and said bypass means enables the coded signal to bypass said switch during the mute mode.

3. The apparatus of claim 2, wherein the coded signal is passed from said tuner via said switch to a monitoring unit during the normal operating mode, and the coded signal is passed from said tuner via said bypass means to the monitoring unit during the mute mode.

4. The apparatus of claim 2, wherein said switch consists of a pole, one contact to which said pole is connected, and another contact coupled to said tuner, and said bypass means consists of said pole, said one contact, and a second contact coupled to said code detector.

* * * * *